(12) United States Patent
Kuwashiro et al.

(10) Patent No.: US 11,745,774 B2
(45) Date of Patent: Sep. 5, 2023

(54) TRACK DISPLACEMENT MEASUREMENT DEVICE, TRACK DISPLACEMENT MEASUREMENT SYSTEM, AND TRACK DISPLACEMENT MEASUREMENT METHOD

(71) Applicant: Kawasaki Railcar Manufacturing Co., Ltd., Kobe (JP)

(72) Inventors: Shingo Kuwashiro, Kobe (JP); Masayuki Mitsue, Kobe (JP); Teruhisa Nakaoka, Kobe (JP); Ryoji Negi, Kobe (JP)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 0 days.

(21) Appl. No.: 17/848,391

(22) Filed: Jun. 24, 2022

(65) Prior Publication Data

US 2022/0315070 A1   Oct. 6, 2022

Related U.S. Application Data

(63) Continuation of application No. PCT/JP2020/048736, filed on Dec. 25, 2020.

(30) Foreign Application Priority Data

Dec. 26, 2019 (JP) .................................. 2019-236015

(51) Int. Cl.
*B61K 9/08* (2006.01)
*G01C 19/00* (2013.01)
*B61L 23/04* (2006.01)

(52) U.S. Cl.
CPC .............. *B61K 9/08* (2013.01); *B61L 23/047* (2013.01); *G01C 19/00* (2013.01)

(58) Field of Classification Search
CPC ..... B61K 9/08; B61L 15/0081; B61L 23/047; E01B 35/00; G01C 19/00; G01C 21/005
See application file for complete search history.

(56) References Cited

U.S. PATENT DOCUMENTS

| 2004/0122569 A1* | 6/2004 | Bidaud | B61L 23/047 |
| | | | 701/19 |
| 2004/0173033 A1* | 9/2004 | Gilbert | B61K 9/08 |
| | | | 340/686.2 |

(Continued)

FOREIGN PATENT DOCUMENTS

| JP | 5301477 B2 | 9/2013 |
| JP | 2014-240262 A | 12/2014 |

(Continued)

OTHER PUBLICATIONS

International Search Report and Written Opinion dated Mar. 23, 2021, received for PCT Application PCT/JP2020/048736, filed on Dec. 25, 2020, 9 pages including English Translation.

*Primary Examiner* — Michael J Dalbo
(74) *Attorney, Agent, or Firm* — XSENSUS LLP

(57) ABSTRACT

A track displacement measurement device is a track displacement measurement device that measures displacement of the track on which a railroad car runs, and determines first displacement of the track by performing processing including an integration operation based on motion detection signal responsive to motion of the railroad car due to displacement of the track, determines second displacement of the track based on the rotational movement detection signal responsive to rotational movement of the railroad car, and determines combined displacement of the track based on the first displacement and the second displacement.

19 Claims, 7 Drawing Sheets

(56) References Cited

U.S. PATENT DOCUMENTS

2013/0248658 A1* 9/2013 Takagi .................... G01S 19/50
246/122 R
2014/0341435 A1* 11/2014 Shimada .............. G01B 11/002
382/104
2016/0114817 A1* 4/2016 Soda ........................ B61K 9/08
73/146

FOREIGN PATENT DOCUMENTS

| JP | 2019-93928 A | 6/2019 |
| KR | 10-2010-0068595 A | 6/2010 |

* cited by examiner

TRACK DISPLACEMENT MEASUREMENT DEVICE, TRACK DISPLACEMENT MEASUREMENT SYSTEM, AND TRACK DISPLACEMENT MEASUREMENT METHOD

CROSS-REFERENCE TO RELATED APPLICATIONS

This application is a continuation application of PCT/JP20201048736 filed Dec. 25, 2020, which claims the benefit of priority of Japanese Patent Application No. JP2019-236015 filed Dec. 26, 2019, the entire contents of each are incorporated herein by reference.

TECHNICAL FIELD

The present disclosure relates to technology of measuring track displacement.

BACKGROUND ART

Patent Document 1 discloses that the distance to rails to be measured is measured using a distance sensor provided to a car, and track displacement is calculated based on distance data output from the distance sensor. Patent Document 1 also discloses that the car rocks (shakes) when running on the rails to be measured, and the influence of rocking components is reduced by providing an acceleration sensor near the distance sensor of the vehicle, double integrating acceleration data from the acceleration sensor to determine a displacement quantity of the car, and correcting data obtained through measurement using the distance sensor by the displacement quantity.

Background Art Document

Patent Document

Patent Document 1: Japanese Patent Application Laid-Open No. 2014-240262

SUMMARY

A track displacement measurement device is a track displacement measurement device that measures displacement of a track on which a railroad car runs, the track displacement measurement device including: an input unit that receives a motion detection signal responsive to motion of the railroad car due to displacement of the track and a rotational movement detection signal responsive to rotational movement of the railroad car; and a processing unit that determines first displacement of the track by performing processing including an integration operation based on the motion detection signal, determines second displacement of the track based on the rotational movement detection signal, and determines combined displacement of the track based on the first displacement and the second displacement.

A track displacement measurement method includes: (a) determining first displacement of a track by performing processing including an integration operation based on motion detection signal responsive to motion of a railroad car due to displacement of the track; (b) determining second displacement of the railroad car based on rotational movement detection signal responsive to rotational movement of the track; and (c) determining combined displacement of the track based on the first displacement and the second displacement.

DESCRIPTION OF EMBODIMENTS

Figure 1:
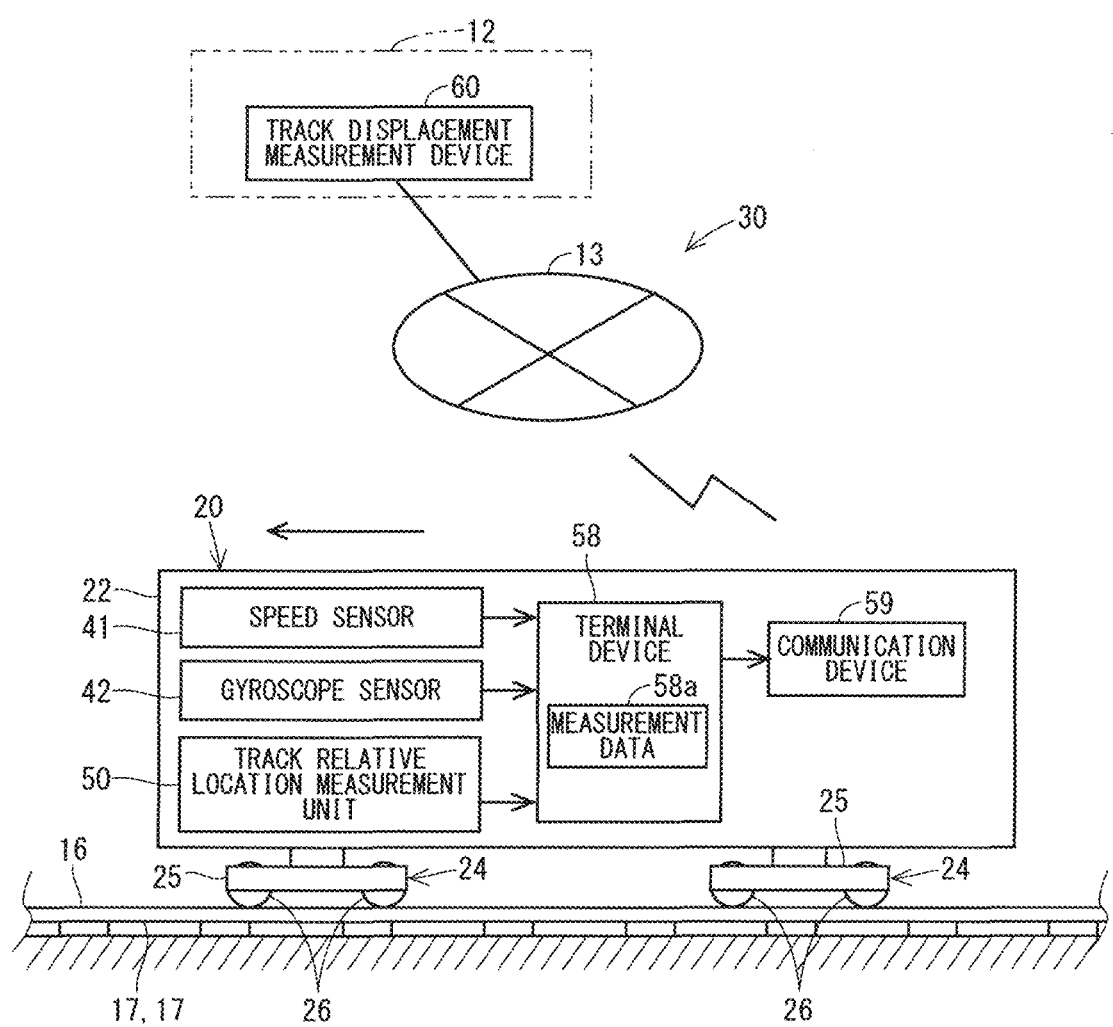
FIG. 1 is a diagram illustrating an overall configuration of a track displacement measurement system according to an embodiment.

A track displacement measurement device, a track displacement measurement system, and a track displacement measurement method according to an embodiment will be described below. FIG. 1 is a diagram illustrating an overall configuration of a track displacement measurement system 30.

One example of a railroad car 20 to which the system 30 is applied will be described. The railroad car 20 runs on a track 16. The track 16 is a road guiding the railroad car 20 along a path. The track 16 herein includes two rails 17. The two rails 17 may be laid in parallel with each other over the ground via ties and the like. The track may be a track including only one rail guiding the railroad car, as in monorails. The track may be provided at a location above the ground using a viaduct and the like. The track may be provided in a tunnel bored underground.

The railroad car 20 includes a body 22 and trucks 24. The trucks 24 each include a truck frame 25 and wheels 26. The wheels 26 are rotatably supported on left and right sides of the truck frame 25 via an axle. A part supporting the axle is also referred to as an axle box. A direction of travel and a direction of backine of the railroad car 20 are also respectively referred to as a forward direction and a backward direction in the present embodiment. Left and right sides sometimes refer to left and right sides as viewed in the direction of travel from the railroad car 20. A side to which gravity is applied in a direction of gravity is also referred to as a lower side, and a side opposite the lower side is also referred to as an upper side. The left and right wheels 26 run on the rails 17 while being guided by the rails 17. The trucks 24 support the body 22 from below. The trucks 24 run on the track 16, so that the railroad car 20 including the body 22 runs along the track 16. The railroad car 20 may be any of an electric train, a locomotive and a freight car of a freight train, and a locomotive and a passenger car of a passenger train as long as it runs on the track 16. The freight train or the passenger train may be a trailing car towed by the locomotive, or may be a motive power car having its motive power. The locomotive may be an electric locomotive, or may be an internal combustion locomotive, such as a diesel locomotive.

The track displacement measurement system is a system to measure displacement of the track 16. Displacement of the track 16 to be measured is at least one of vertical displacement and lateral displacement of the track 16, for example. Measurement of displacement of the track 16 to examine a state of the track 16 is also referred to as inspection.

The track displacement measurement system 30 includes a speed sensor 41, a gyroscope sensor 42, a track relative location measurement unit 50, and a track displacement measurement device 60, The speed sensor 41, the gyroscope sensor 42, and the track relative location measurement unit 50 are provided to the railroad car 20. The track displacement measurement device 60 is provided to a management base 12. The management base 12 is provided at a different location from the railroad car 20. For example, the management base 12 is architecture provided on the ground to monitor the railroad car 20, The speed sensor 41, the gyroscope sensor 42, and the track relative location measurement unit 50 are communicatively connected to a processing unit of the track displacement measurement device 60 via a communication network 13. The communication network 13 may be a wired or wireless communication network, and may be a combination of the wired and wireless communication networks. The communication network 13 may be a public communication network or a communication network using a dedicated line.

Outputs from the speed sensor 41, the gyroscope sensor 42, and the track relative location measurement unit 50 are herein provided to a terminal device 58. The terminal device 58 is configured by a computer including a processor, such as a central processing unit (CPU), a storage, and the like, and stores measurement data 58a based on the outputs from the speed sensor 41, the gyroscope sensor 42, and the track relative location measurement unit 50 in the storage. The terminal device 58 transmits the measurement data 58a to the track displacement measurement device 60 via a communication device 59. The track displacement measurement device 60 performs an operation based on the measurement data 58a to measure displacement of the track 16 on Which the railroad car 20 runs. The measurement data 58a may be transmitted to the track displacement measurement device 60 in real time, or may be transmitted to the track displacement measurement device 60 at predetermined time intervals or at predetermined running distance intervals.

Figure 2:
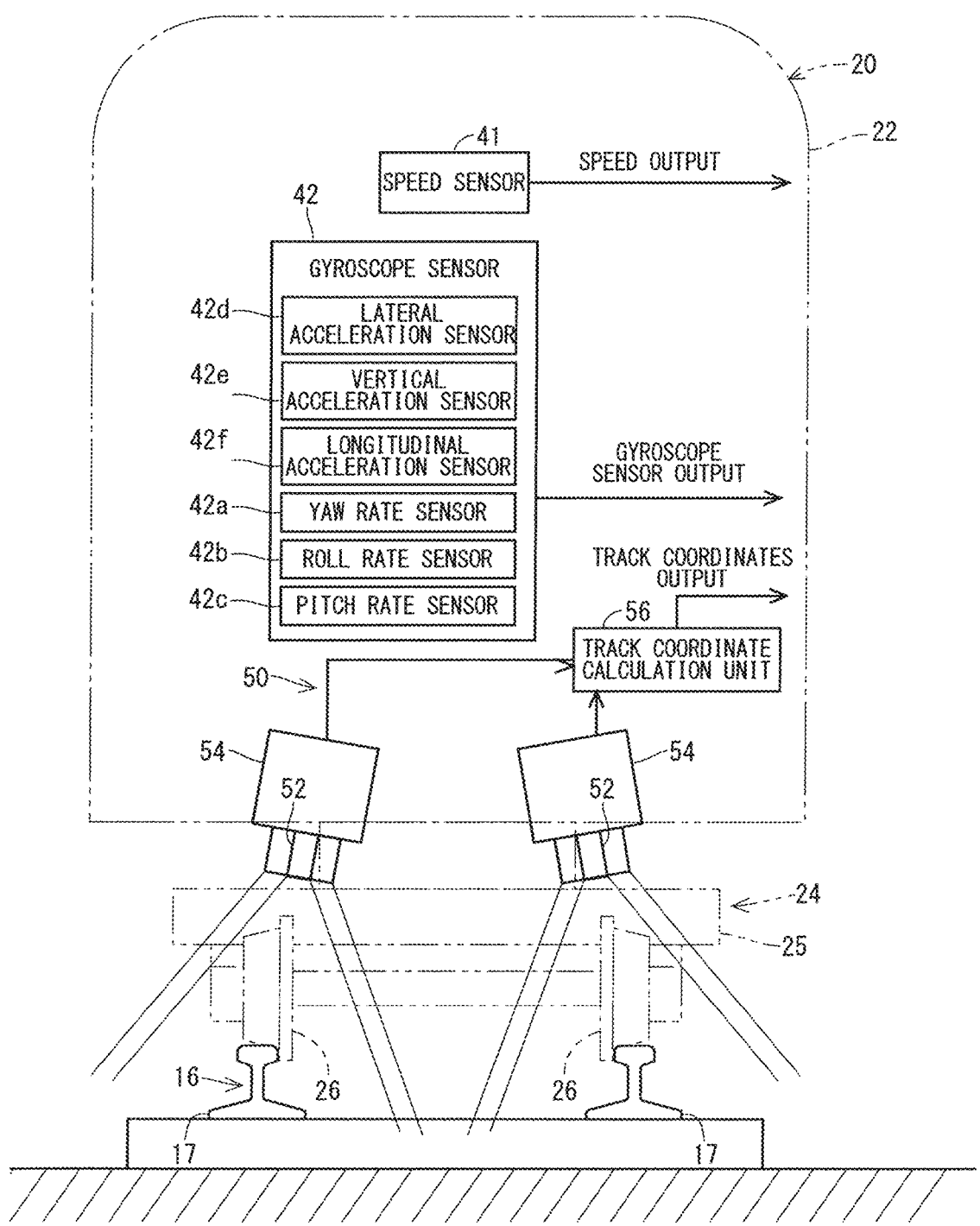
FIG. 2 is a block diagram showing a speed sensor, a gyroscope sensor, and a track relative location measurement unit.

The speed sensor 41, the gyroscope sensor 42, and the track relative location measurement unit 50 provided to the railroad car 20 will be described. FIG. 2 is a block diagram showing the speed sensor 41, the gyroscope sensor 42, and the track relative location measurement unit 50 provided to the railroad car 20.

The gyroscope sensor 42 is an example of a motion detection signal output unit and an example of a rotational movement detection signal output unit. The motion detection signal output unit herein outputs a motion detection signal responsive to motion of the railroad car 20 due to displacement of the track 16. The rotational movement detection signal output unit outputs a rotational movement detection signal responsive to rotational movement of the railroad car 20.

More specifically, the gyroscope sensor 42 detects angular velocity of the railroad car 20, and outputs a signal responsive to the angular velocity. In the present embodiment, the gyroscope sensor 42 includes a yaw rate sensor 42a, a roll rate sensor 42b, and a pitch rate sensor 42c. The yaw rate sensor 42a detects yaw angular velocity of the railroad car 20 about the yaw axis along a vertical direction. The roll rate sensor 42b detects roll angular velocity of the railroad car 20 about the roll axis along a longitudinal direction. The pitch rate sensor 42c detects pitch angular velocity of the railroad car 20 about the pitch axis along a lateral direction. A yaw rate detection signal indicating the angular velocity about the yaw axis, a roll rate detection signal indicating the angular velocity about the roll axis, and a pitch rate detection signal indicating the angular velocity about the pitch axis are output from the gyroscope sensor 42. The sensors 42a, 42b, and 42c may each detect the angular velocity $1w$ any method, such as a method of using a gyroscopic effect and a method of using the Coriolis force.

In the present embodiment, the gyroscope sensor 42 includes a lateral acceleration sensor 42d, a vertical acceleration sensor 42e, and a longitudinal acceleration sensor 42f, The lateral acceleration sensor 42d detects acceleration in the lateral direction of the railroad car 20. The vertical acceleration sensor 42e detects acceleration in the vertical direction of the railroad car 20. The longitudinal acceleration sensor 42f detects acceleration in the longitudinal direction of the railroad car 20. A lateral acceleration detection signal indicating the acceleration in the lateral direction, a vertical acceleration detection signal indicating the acceleration in the vertical direction, and a longitudinal acceleration detection signal indicating the acceleration in the longitudinal direction are output from the gyroscope sensor 42. The acceleration sensors 42d, 42e, and 42f may each detect the acceleration by any method, such as a method of detecting acceleration from a change in location due to the acceleration.

The railroad car 20 shakes laterally due to lateral displacement of the track 16, and shakes vertically due to vertical displacement of the track 16. The railroad car 20 rotates about the roll axis due to displacement of the pair of rails 17 relative to each other. The lateral acceleration detection signal, the vertical acceleration detection signal, and the roll rate detection signal are thus examples of the motion detection signal responsive to motion of the railroad car 20 due to displacement of the track 16. The gyroscope sensor 42 is an example of the motion detection signal output unit.

A yaw rate detection signal and a pitch rate detection signal are examples of the rotational movement detection signal responsive to rotational movement of the railroad car 20. The gyroscope sensor 42 is thus an example of the rotational movement detection signal output unit.

The above-mentioned sensors 42a, 42b, 42c, 42d, 42e, and 42f are not necessarily to be unitized as a single gyroscope sensor, and may be separated in any units and incorporated in the railroad car 20. One or more of the sensors 42a, 42h, 42c, 42d, 42e, and 42f (e.g., the longitudinal acceleration sensor 42f) may be omitted.

The speed sensor 41 is a sensor that detects a speed of the railroad car 20. The speed sensor 41 may be a tachometer generator incorporated in the railroad car 20. Instead of providing the speed sensor 41, a Global Positioning System (GPS) receiving unit may be provided to the railroad car 20. In this case, the speed of the railroad car 20 may be determined from location information determined based on a signal output from the GPS receiving unit.

The track relative location measurement unit 50 detects a location of the track 16 relative to the railroad car 20, and outputs a track relative location signal responsive to the relative location. In the present embodiment, the track relative location measurement unit 50 includes irradiation units 52, imaging cameras 54, and a track coordinate calculation unit 56.

The irradiation units 52 and the imaging cameras 54 are provided for the respective two rails 17. The irradiation units 52 irradiate top portions and inner side surfaces of the rails 17 with slit light. The imaging cameras 54 are provided to capture images of the top portions and the inner side surfaces of the rails 17 irradiated with the above-mentioned slit light.

The track coordinate calculation unit 56 is configured by a computer including a processor, such as a CPU, a storage, and the like. The processor performs processing according to a prestored program to calculate coordinates of the top portions and the inner side surfaces of the rails 17 based on image data from the above-mentioned imaging cameras 54. That is to say, the imaging cameras 54 capture images of light reflected from the slit light with which the surface of the above-mentioned rails 17 are irradiated, and data of the captured images is provided to the track coordinate calculation unit 56. The track coordinate calculation unit 56 determines coordinates of surfaces of the rails 17, such as coordinates of upper surfaces of heads and coordinates of inner side surface of the heads, based on a location of slit light in the image data by a light sectioning method. Locations of the rails 17 are represented by coordinates in a coordinate plane parallel to the vertical direction and the lateral direction of the railroad car 20 relative to the railroad car 20, for example. Data of the images captured by the imaging cameras 54 may be transmitted to the track displacement measurement device 60 of the management base 12, and the track displacement measurement device may perform processing to determine the coordinates of the rails 17.

In addition to the above-mentioned configuration, various distance sensors, such as a laser sensor and an ultrasonic sensor, may be used as the track relative location measurement unit 50.

The speed sensor 41, the gyroscope sensor 42, and the track relative location measurement unit 50 described above may be provided at any location of the railroad car 20. For example, the gyroscope sensor 42 and the track relative location measurement unit 50 may be provided to the body 22 or to the trucks 24, The gyroscope sensor 42 and the imaging cameras 54 may be provided to a common portion of the railroad car 20, for example, to a common portion of either the body 22 or the trucks 24. In this case, the gyroscope sensor 42 and the imaging cameras 54 move similarly with respect to the track 16, so that orientations of the imaging cameras 54 can more accurately be determined based on an output from the gyroscope sensor 42. When the gyroscope sensor 42 is provided to the trucks 24, in particular, to the axle box, a signal linearly reflecting displacement of the track 16 is output compared with a case where the gyroscope sensor 42 is provided to the body 22.

Figure 3:
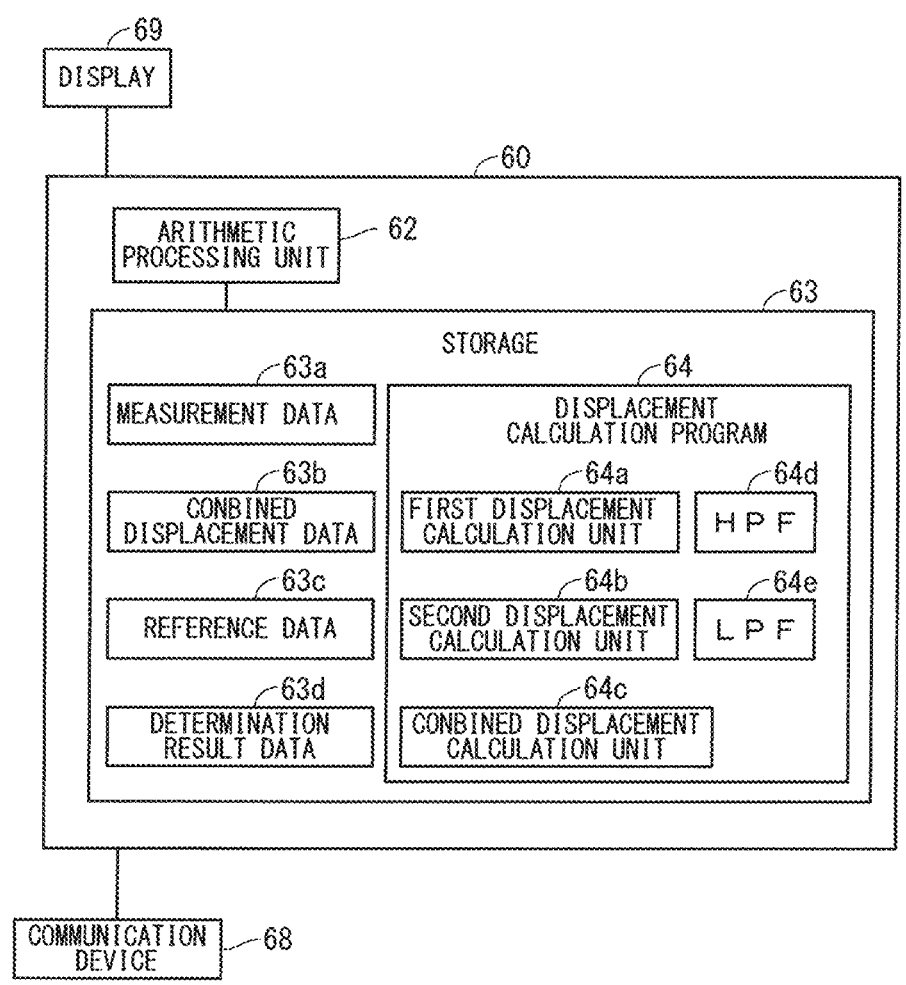
FIG. 3 is a block diagram showing a track displacement measurement device.

The track displacement measurement device 60 will be described. FIG. 3 is a block diagram showing the track displacement measurement device 60. The track displacement measurement device 60 is configured by a computer including an arithmetic processing unit 62, a storage 63, random access memory (RAM), and the like. The arithmetic processing unit 62 is configured by a processor, such as a CPU. The storage 63 is configured by a nonvolatile storage device, such as a hard disk drive (HDD) and a solid-state drive (SSD). Measurement data 63a, combined displacement data 63b, reference data 63c, determination result data 63d, a displacement calculation program 64, and the like are stored in the storage 63.

The measurement data 63a includes pieces of measurement data transmitted from the speed sensor 41, the gyroscope sensor 42, and the track relative location measurement unit 50 provided to the railroad car 20. The measurement data 63a is stored as data associating the distance from a predetermined reference location and each of the pieces of measurement data for each of the two rails 17, for example.

In description made below, displacement of the track 16 can refer to displacement of each of the rails 17. The combined displacement data 63b is stored as data associating combined displacement calculated by the track displacement measurement device 60 with the distance from the predetermined reference location, for example. The reference data 63c is data to determine whether the measured combined displacement of the track 16 is normal or not, for example, and is stored as data associating the distance from the predetermined reference location with a normal value or a normal range, for example. The determination result data 63d is data on a result of determination on whether the combined displacement is normal or not, for example, and is stored as data to determine Whether a location or a range relative to the predetermined reference location is normal or not.

The displacement calculation program 64 is a program to determine the combined displacement, and the arithmetic processing unit 62 performs processing written in the displacement calculation program 64. The track displacement measurement device 60 thus determines the combined displacement of the track 16 as the processing unit. The displacement calculation program 64 includes, as processing modules, a first displacement calculation unit 64a, a second displacement calculation unit 64b, a combined displacement calculation unit 64c, a high-pass filter 64d, and a low-pass filter 64e, for example. The first displacement calculation unit 64a is a module that determines first displacement of the track 16 by performing processing including an integration operation based on the motion detection signal. The second displacement calculation unit 64b is a module that determines second displacement of the track 16 based on the rotational movement detection signal. The combined displacement calculation unit 64c is a module that determines the combined displacement of the track 16 based on the first displacement and the second displacement. The high-pass filter 64d is an example of a low frequency component attenuation unit that attenuates low frequency components of the motion detection signal. The low-pass filter 64e is an example of a high frequency component attenuation unit that attenuates high frequency components of the rotational movement detection signal.

The track displacement measurement device 60 is not necessarily to be provided to the management base 12, and may be provided at a different location, for example, to the railroad car 20. Processing performed by the track displacement measurement device 60 may be distributed among computers. In this case, the computers may be provided at any, locations.

A communication device 68 and a display 69 are connected to the track displacement measurement device 60. The communication device 68 is a device that performs communication with the terminal device 58 via the communication network 13. Signals from the speed sensor 41, the gyroscope sensor 42, and the track relative location measurement unit 50 described above are input via the communication device 68. The communication device 68 is an example of an input unit that receives the motion detection signal and the rotational movement detection signal. The communication device 68 is also an example of an input unit that receives the track relative location signal responsive to the location of the track 16 relative to the railroad car 20. Furthermore, the communication device 68 is an example of an input unit that receives, as the rotational movement detection signal, an angular velocity signal responsive to the angular velocity of the railroad car 20, The input unit may be an input circuit that directly receives the detection signal from at least one of the speed sensor 41 and the gyroscope sensor 42.

The display 69 is a liquid crystal display, for example. The display 69 may be a display provided at a fixed location, or may be a portable display. The display 69 may be a smartphone or a tablet terminal device. The display 69 displays an image based on data transmitted from the track displacement measurement device 60.

Figure 4:
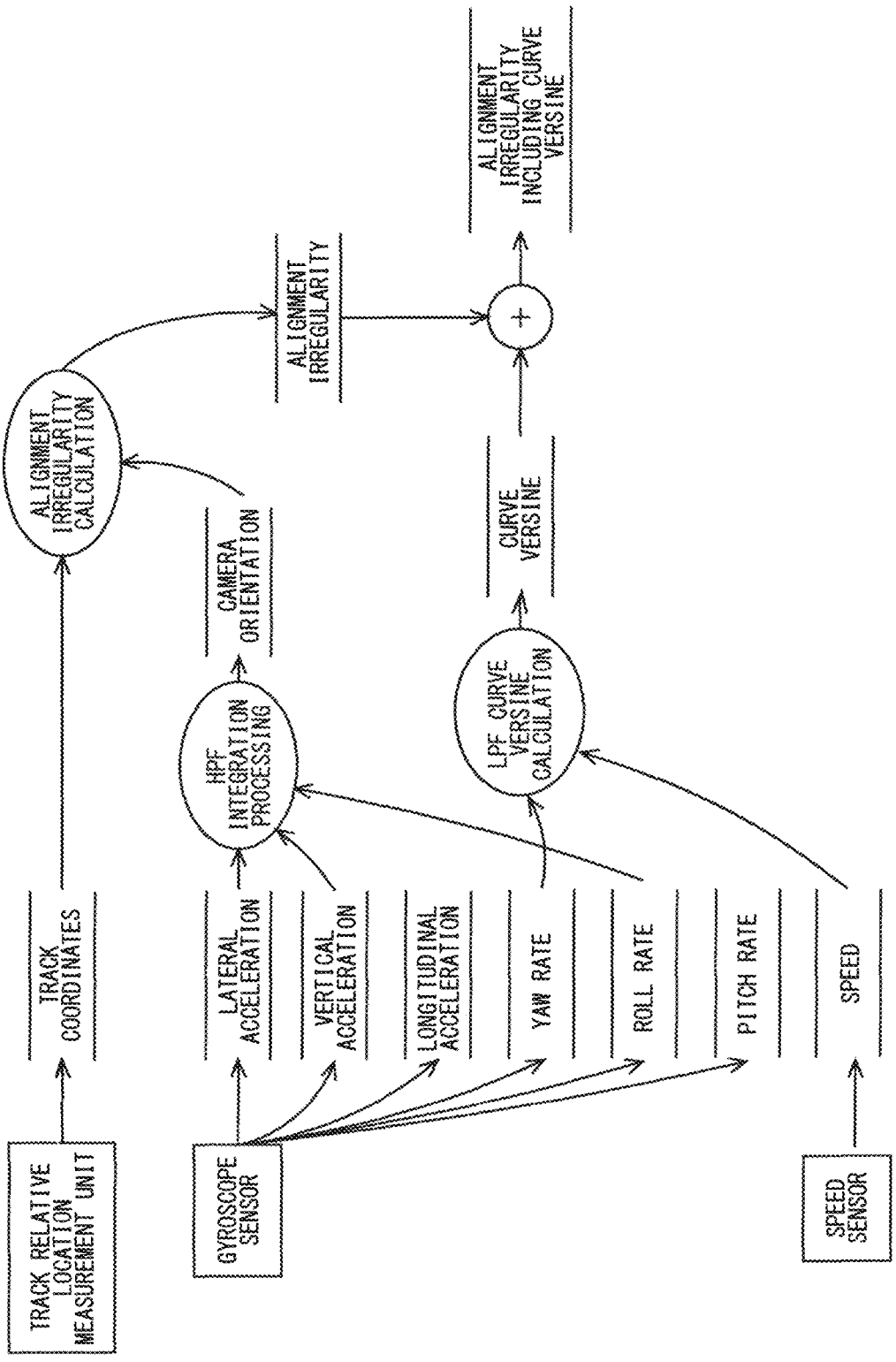
FIG. 4 is a data flow diagram showing data flow in the system.

As for an example of processing performed by the track displacement measurement device 60, processing to determine lateral displacement of the track 16 will mainly be described. FIG. 4 is a data flow diagram showing data flow in the system. Description made below is based on the assumption that the combined displacement along the width of the track 16 is represented by a combination of the first displacement in a first wavelength range and the second displacement in a second wavelength range larger than the first wavelength range in a direction of extension of the track 16. A wavelength frilling within the second wavelength range is larger than a wavelength falling within the first wavelength range, so that the second displacement in the second wavelength range may be displacement caused by a curve (e.g., a curve having a radius of curvature of 100 m or more) of the track 16 represented in track design, for example. The first wavelength range is smaller than the second wavelength range, so that the first displacement in the first wavelength range may be displacement caused by deformation (e.g., deformation having a radius of curvature of less than 100 m, in particular, approximately several tens of meters) of the rails 17, for example. Displacement of a curved track 16 is sometimes managed by the versine, and the second displacement is also referred to as curve versine in description made below. The first displacement is also simply referred to as alignment irregularity as irregularity measured regardless of whether the track 16 is curved in track design. Combined displacement determined by combining the alignment irregularity and the curve versine is also referred to as alignment irregularity including the curve versine.

As shown in FIG. 4, the track relative location measurement unit 50 determines coordinates of the track 16. The gyroscope sensor 42 determines lateral acceleration, vertical acceleration, longitudinal acceleration, the yaw rate, a roll rate, and the pitch rate. The speed sensor 41 determines the speed. These pieces of data are provided from the railroad car 20 to the track displacement measurement device 60 on a base station side.

The lateral acceleration, the vertical acceleration, and the roll rate are subjected to high-pass filtering and integration processing to calculate the orientations of the imaging cameras 54. The coordinates of the track 16 and the orientations of the imaging cameras 54 are subjected to alignment irregularity calculation processing to calculate the alignment irregularity. The alignment irregularity may be represented by irregularity (coordinates) of side surfaces of the track 16 (e.g., the inner side surfaces of the rails 17), for example.

The yaw rate and the speed are subjected to low-pass filtering and curve versine calculation processing to determine the curve versine. The curve versine and the above-mentioned alignment irregularity are combined to determine the alignment irregularity including the curve versine.

Figure 5:
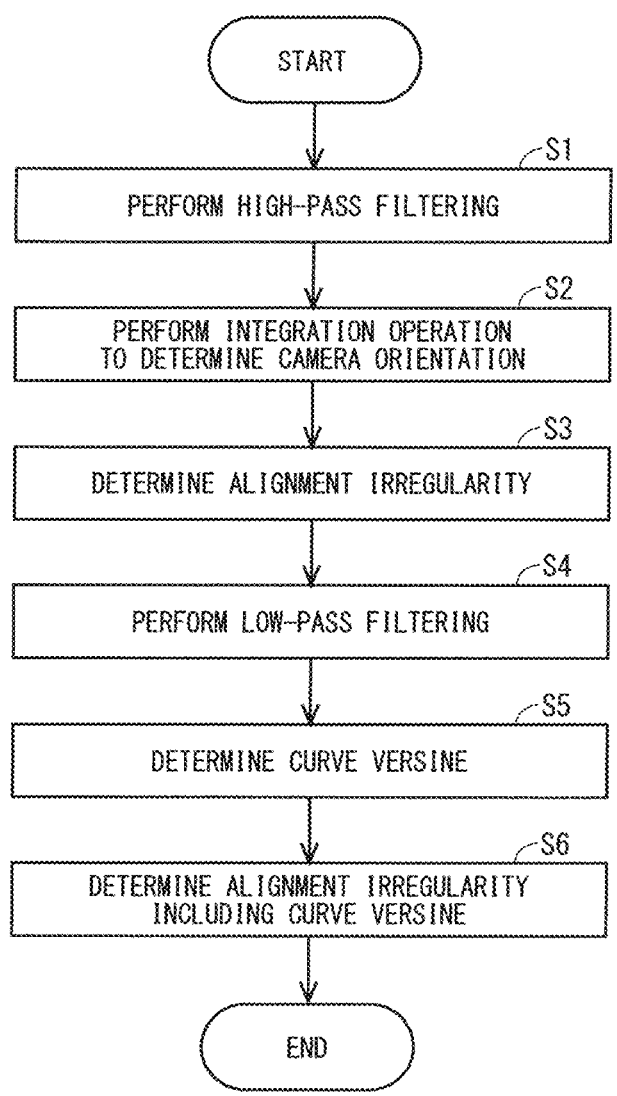
FIG. 5 is a flow chart showing an example of processing performed by the track displacement measurement device.

FIG. 5 is a flow chart showing an example of processing performed by the track displacement measurement device 60.

In step S1, high-pass filtering is performed on the lateral acceleration, the vertical acceleration, and the roll rate. For example, the above-mentioned high-pass filter 64d performs high-pass digital filtering on a lateral acceleration data sequence, a vertical acceleration data sequence, and a roll rate data sequence. High frequency components are thus extracted from the lateral acceleration data sequence, the vertical acceleration data sequence, and the roll rate data sequence, and low frequency components are attenuated. Step S1 may be omitted, and analog signals of the lateral acceleration, the vertical acceleration, and the roll rate output from the gyroscope sensor 42 may be input into an analog high-pass filter circuit.

In next step S2, the integration operation is performed on the lateral acceleration, the vertical acceleration, and the roll rate to determine the orientations of the imaging cameras 54. That is to say, the gyroscope sensor 42 and the imaging cameras 54 are provided to the common railroad car 20, so that the lateral acceleration, the vertical acceleration, and the roll rate from the gyroscope sensor 42 indicate the lateral acceleration, the vertical acceleration, and the roll rate of the imaging cameras 54. Thus, lateral and vertical locations (coordinates) of the imaging cameras 54 are calculated by numerically integrating each of the lateral acceleration data sequence and the vertical acceleration data sequence twice, for example. Tilts of the imaging cameras 54 in the coordinate plane parallel to the vertical direction and the lateral direction of the railroad car 20 are calculated by numerically integrating the roll rate data sequence, for example. The lateral and vertical locations (coordinates) and the tilts of the imaging cameras 54 are represented relative to the orientations of the imaging cameras 54 of the railroad car 20 during stopping, for example.

The lateral acceleration, the vertical acceleration, and the roll rate subjected to the operation in step S2 are pieces of data with reduced low frequency components. Divergence of a result value is thus suppressed even when the integration operation is performed in step S2.

In next step S3, the alignment irregularity is determined based on the relative location measured by the track relative location measurement unit 50 and the orientations of the imaging cameras 54 determined in step S2. That is to say, the relative location measured by the track relative location measurement unit 50 is the coordinates of the track 16 relative to the railroad car 20. Coordinate movement transformation processing and coordinate rotation transformation processing are performed on the coordinates representing the relative location to move and rotate the coordinates representing the relative location in an opposite direction by a distance corresponding to the lateral locations, the vertical locations, and the tilts of the imaging cameras 54 determined in step S2, The alignment irregularity (first displacement) of the track 16 from which the influence of the orientation of the railroad car 20 has been eliminated is thus calculated.

In steps S2 and S3, the alignment irregularity is determined as the first displacement by performing processing including the integration operation based on the motion detection signal on the above-mentioned relative location.

In next step S4, low-pass filtering is performed on the yaw rate. For example, the above-mentioned low-pass filter 64e performs low-pass digital filtering on a yaw rate data sequence. Low frequency components are thus extracted from the yaw rate data sequence, and high frequency components are attenuated. Step S4 may be omitted, and a yaw rate analog signal output from the gyroscope sensor 42 may be input into an analog low-pass filter circuit.

In step S4, signal components corresponding to the frequency components attenuated in step S1 are extracted. That is to say, in the above-mentioned processing to determine the alignment irregularity, high-pass filtering is performed in step S1 to avoid divergence occurring when the integration operation is performed in step S2. Frequency components to compensate for the frequency components attenuated in step S1 are extracted in step S4. As a cut-off frequency in step S1, a value suitable for avoiding divergence when the integration operation is performed in step S2 is selected, for example. As a cut-off frequency in step S4, a value suitable for compensating for the frequency components attenuated in step S1 is selected, for example. The cut-off frequency in step S1 and the cut-off frequency in step S4 may be set in a range of 0.1 Hz to 1 Hz, for example. The cut-off frequency in step S1 and the cut-off frequency in step S4 may be the same or different. These cut-off frequencies are selected in consideration of filter properties, a minimum radius of the track 16 in design, the speed (e.g., a normal operating speed) of the railroad car 20, and the like.

In next step S5, the curve versine is determined as the second displacement of the track 16 based on the rotational movement detection signal. The curve versine is herein determined based on the speed of the railroad car 20 and the yaw rate of the railroad car 20. A method of calculating the curve versine will be described.

An equation (1) on circular motion below holds true, where w is the yaw rate, v is the car speed. R is a radius of curvature of the track 16, and V is the curve versine.

$$v=R\omega \quad (1)$$

A curvature k is expressed by an equation (2) below, where k is a curvature of the track 16.

$$k=1/R \quad (2)$$

An equation (3) below can be obtained from the equations (1) and (2).

$$k=\omega/v \quad (3)$$

The curve versine V is obtained by an equation (4) below from a geometric relationship of the curve versine V on the track 16 having the radius of curvature R. s is a chord length.

$$V=s^2/(8R) \quad (4)$$

An equation (5) is obtained by substituting the equation (2) into the equation (4).

$$V=ks^2/8 \quad (5)$$

The chord length s is a reference measurement length when the curve versine V of the track 16 is evaluated, and thus may have a constant value set arbitrarily. For example, the chord length s to measure the curve versine V may be set to 10 m. Assume that the chord length s is 10 in, an equation (6) is obtained by substituting the equation (3) into the equation (5), and the curve versine V can be determined from the yaw rate w and the speed v.

$$V=k\times 10^2/8=12.5\times k=12.5\omega/v \quad (6)$$

The curve versine V can thus be determined based on the yaw rate w from the gyroscope sensor 42 and the speed v from the speed sensor 41 in step S5.

In next step S6, the alignment irregularity including the curve versine is determined as the combined displacement of the track 16 based on the alignment irregularity and the curve versine. The alignment irregularity including the curve versine can herein be determined by adding the alignment irregularity and the curve versine. A value indicating the combined displacement indicates a degree of actual displacement of the track 16, and thus can be used as data to sensibly grasp an actual condition of the track 16. In particular, the curve versine is sometimes used as a reference to grasp displacement of the track 16 in an existing evaluation method, so that a state of the track 16 can be grasped by using the reference. The combined displacement is only preferred to be determined as an evaluation value to evaluate displacement of the track 16. The combined displacement may thus not necessarily be determined as the sum of the first displacement and the second displacement. For example, the combined displacement may be determined through subtraction or integration of the first displacement and the second displacement.

The determined combined displacement of the track 16 is stored in the storage 63 as the combined displacement data 63b associating the determined combined displacement of the track 16 with the location of the track 16. The location of the track 16 may be defined by the distance (e.g., kilometrage) from the predetermined reference location, for example.

Figure 6:
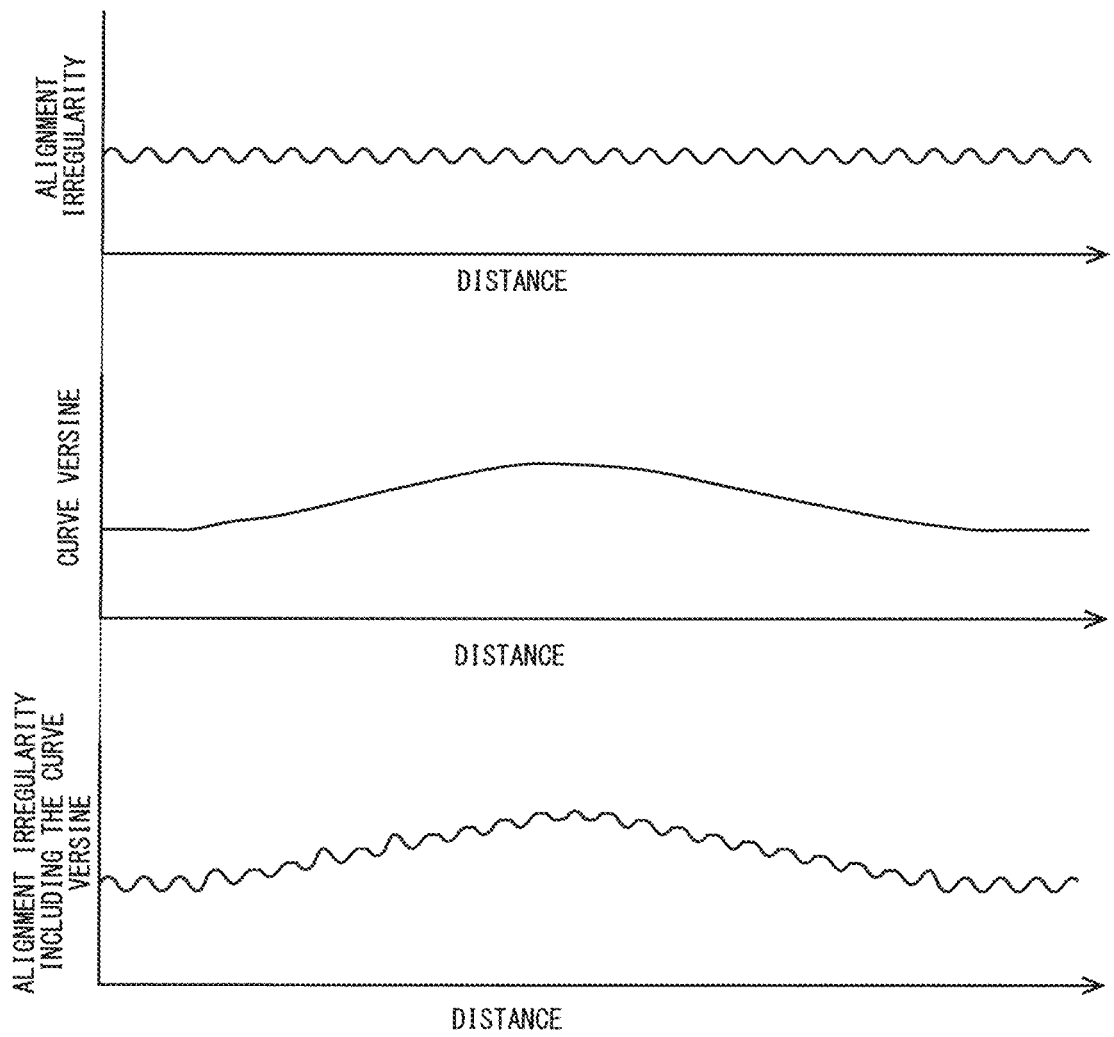
FIG. 6 is a diagram conceptually showing a displacement relationship.

FIG. 6 is a diagram conceptually showing a relationship among the alignment irregularity, the curve versine, and the alignment irregularity including the curve versine. As shown in FIG. 6, data indicating displacement of each track 16 is data associating the distance from the predetermined reference location and displacement. In steps S1 to S3, high-pass filtering is performed, and thus the alignment irregularity corresponding to small wavelength components is calculated. In steps S5 and S6, low-pass filtering is performed, and thus the curve versine corresponding to large wavelength components is calculated. In step S7, the alignment irregularity and the curve versine are added, and thus the alignment irregularity including the curve versine reflecting both the amplitude of the alignment irregularity and the amplitude of the curve versine is determined.

Figure 7:
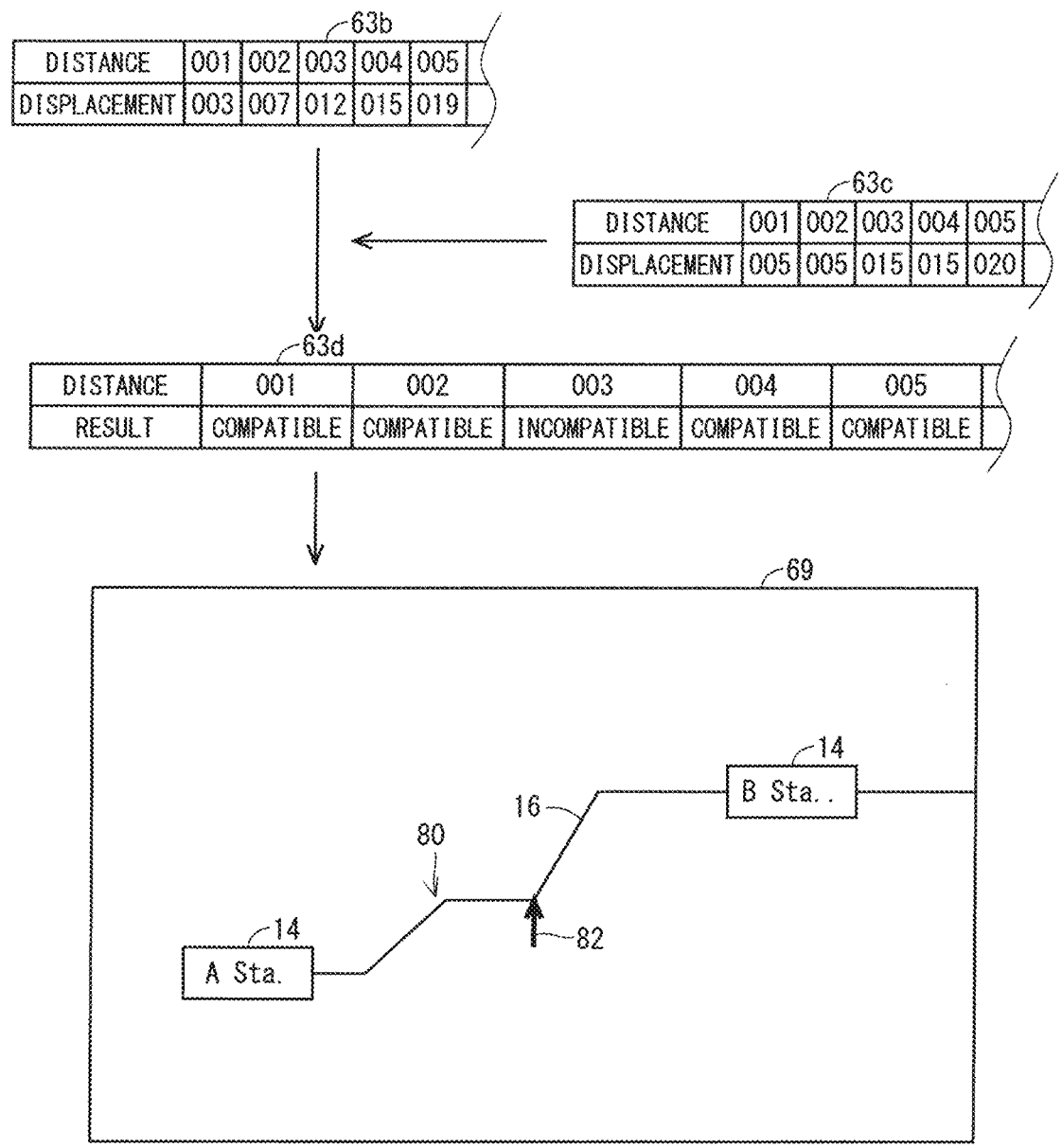
FIG. 7 is a diagram showing an example of notification of a result of comparison provided through a display.

The track displacement measurement device 60 may perform processing to compare the combined displacement data 63b with the reference data 63c according to the displacement calculation program, and provide notification of a result of comparison through the display 69 as a notification unit. For example, as shown in FIG. 7, the combined displacement data 63b is stored as data associating the combined displacement with the location (distance) of the track 16, and the reference data 63c is stored as data associating reference displacement with the location (distance) of the track 16. The combined displacement and the reference displacement are compared for each of discrete distances. It may be determined that the combined displacement for the distance is incompatible when not meeting a condition relative to the reference displacement, and is compatible when meeting the condition. For example, the condition may be a condition that the combined displacement is within a range of the reference displacement a predetermined value. The reference displacement may be defined by a numerical range, and the condition may be a condition that the combined displacement is within the reference range. The result of comparison may be stored as the determination result data 63d associating compatibility or incompatibility with the location (distance) of the track 16, for example.

The display 69 may display the result of comparison so that an incompatible portion of the track 16 can be identified. For example, the display 69 may display an image in which the incompatible portion is shown by an arrow 82 and the like on a route map 80 displaying the track 16, station names 14, and the like. Alternatively, the incompatible portion may be displayed by differentiating a color of the incompatible portion from a color of the other portions of the track 16, or displaying a list associating the kilometrage of the track 16 with compatibility or incompatibility. The notification unit may be a sounding body that emits a sound, a printing device that outputs printed media, and the like.

According to the track displacement measurement device 60, the track displacement measurement system 30, and the track displacement measurement method as described above, the first displacement (alignment irregularity) of the track 16 is determined by performing processing including the integration operation based on the motion detection signal (herein, a lateral acceleration signal, a vertical acceleration signal, and a roll rate signal). Furthermore, the second displacement (curve versine) of the track 16 is determined based on the rotational movement detection signal (herein, a yaw rate signal). Displacement suitably determined by performing processing including the integration operation and displacement suitably determined by performing processing different from the processing including the integration operation can separately be determined. The combined displacement (alignment irregularity including the curve versine) can be determined by combining the first displacement and the second displacement determined separately. The track displacement more accurately reflecting large and small curves of the track 16 can thus be measured.

The first displacement (alignment irregularity) is determined by performing processing including the integration operation based on the motion detection signal (herein, the lateral acceleration signal, the vertical acceleration signal, and the roll rate signal) on the location of the track 16 relative to the railroad car 20 determined by the track relative location measurement unit 50, so that the first displacement (alignment irregularity) of the track 16 can be determined so that as much as possible of the influence of motion of the railroad car 20 due to displacement of the track is eliminated.

The high-pass filter 64*d* attenuates the low frequency components of the motion detection signal (herein, the lateral acceleration signal, the vertical acceleration signal, and the roll rate signal), so that divergence of an operation result is suppressed when the above-mentioned integration operation is performed.

The first displacement (alignment irregularity) reflects displacement responsive to the high frequency components less likely to be attenuated mainly by the high-pass filter 64*d*. The low-pass filter 64*e* thus attenuates the high frequency components of the rotational movement detection signal (herein, the yaw rate signal). The second displacement thus reflects displacement responsive to the low frequency components less likely to be attenuated by the low-pass filter 64*e*. By combining the first displacement and the second displacement to determine the combined displacement, the track displacement more accurately reflecting large and small curves of the track 16 can be measured.

The second displacement can be determined based on the speed of the railroad car 20 and the angular velocity (herein, the yaw rate) of the railroad car 20 without performing the integration operation.

The combined displacement as described above is determined based on outputs from the imaging cameras 54, the gyroscope sensor 42, and the like. Displacement of the track 16 can thus be measured at a low cost using the railroad car 20 not being a dedicated car, such as a track inspection car.

By storing the combined displacement of the track 16 in the storage 63 as the combined displacement data 63*h*, data associating a result of measurement of displacement of the track 16 with the location of the track 16 can be stored.

By comparing the combined displacement data 63*b* with the reference data 63*c*, and providing notification of the result of comparison through the display 69 as the notification unit, displacement of the track 16 can easily be known, and, as a result, maintenance can easily be performed.

The track displacement measurement device 60 is provided to the management base 12, so that displacement of the track 16 can be monitored in the management base 12.

While a case where displacement of the track 16 in the lateral direction is measured has mainly been described in the present embodiment, displacement of the track 16 in the vertical direction can similarly be determined. For example, the first displacement, that is, longitudinal level displacement corresponding to alignment irregularity along the width can be determined by similar processing to that performed in the above-mentioned embodiment. The second displacement, that is, the curve versine in the vertical direction can be determined by performing an operation based on the pitch rate in place of the above-mentioned operation based on the yaw rate. The combined displacement, that is, the longitudinal level irregularity including the curve versine in the vertical direction can similarly be determined based on the longitudinal level irregularity and the curve versine in the vertical direction.

While an example in which the track displacement measurement device 60 is provided to the management base 12 has been described in the present embodiment, the track displacement measurement device 60 may be incorporated in the railroad car 20.

Configurations described in the above-mentioned embodiments and modifications can be combined with each other as appropriate unless any contradiction occurs.

The foregoing description is in all aspects illustrative and does not restrict the present disclosure. It is understood that numerous unillustrated modifications can be devised without departing from the scope of the present disclosure.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The present disclosure includes the following aspects.

A first aspect is a track displacement measurement device that measures displacement of a track on which a railroad car runs, the track displacement measurement device including: an input unit that receives a motion detection signal responsive to motion of the railroad car due to displacement of the track and a rotational movement detection signal responsive to rotational movement of the railroad car; and a processing unit that determines first displacement of the track by performing processing including an integration operation based on the motion detection signal, determines second displacement of the track based on the rotational movement detection signal, and determines combined displacement of the track based on the first displacement and the second displacement.

According to the track displacement measurement device, the first displacement can be determined by performing processing including the integration operation based on the motion detection signal responsive to motion of the railroad car due to displacement of the track. Displacement suitably determined by performing processing different from the processing including the integration processing can be determined as the second displacement of the track based on the rotational movement detection signal. The combined displacement can be determined based on the first displacement and the second displacement. The track displacement more accurately reflecting curves of the track can thus be measured.

A second aspect is the track displacement measurement device according to the first aspect, wherein the input unit receives a track relative location signal responsive to a location of the track relative to the railroad car, and the processing unit determines the first displacement by performing the processing including the integration operation based on the motion detection signal on the location of the track relative to the railroad car based on the track relative location signal. The first displacement of the track can thus be determined so that as much as possible of the influence of motion of the railroad car due to displacement of the track is eliminated.

A third aspect is the track displacement measurement device according to the first or the second aspect, further comprising a low frequency component attenuation unit that attenuates a low frequency component of the motion detection signal. In this case, divergence of an operation result is suppressed when the integration operation is performed based on the motion detection signal.

A fourth aspect is the track displacement measurement device according to the third aspect, further comprising a high frequency component attenuation unit that attenuates a high frequency component of the rotational movement detection signal. The first displacement reflects displacement responsive to the high frequency component not attenuated mainly by the low frequency component attenuation unit. The second displacement reflects displacement responsive to the low frequency component not attenuated mainly by the high frequency component attenuation unit. By combining the first displacement and the second displacement to determine the combined displacement, track displacement reflecting curves of the track can be measured.

A fifth aspect is the track displacement measurement device according to any one of the first to the fourth aspects, wherein an angular velocity signal responsive to angular velocity of the railroad car is input as the rotational movement detection signal, and the processing unit determines the second displacement based on a speed of the railroad car and the angular velocity of the railroad car based on the angular velocity signal. In this case, the second displacement can be determined based on the speed of the railroad car and the angular velocity.

A sixth aspect is the track displacement measurement device according to any one of the first to the fifth aspects, further comprising a storage that stores combined displacement data associating the combined displacement of the track determined by the processing unit with a location of the track. A result of measurement of the track can be stored to be associated with the location of the track.

A seventh aspect is the track displacement measurement device according to any one of the first to the sixth aspects, further comprising a notification unit that compares the combined displacement with a reference value, and provides notification of a result of comparison. Notification of a result of comparison of the combined displacement with the reference value can thus easily be provided.

A track displacement measurement system according to an eighth aspect includes: the track displacement measurement device according to any one of the first to the seventh aspects; a motion detection signal output unit that is provided to the railroad car, and outputs the motion detection signal responsive to motion of the railroad car due to displacement of the track; and a rotational movement detection signal output unit that is provided to the railroad car, and outputs the rotational movement detection signal responsive to rotational movement of the railroad car. The track displacement can thus be determined based on the motion detection signal output unit and the rotational movement detection signal output unit provided to the railroad car.

A ninth aspect is the track displacement measurement system according to the eighth aspect, wherein the processing unit is provided to a management base, and the motion detection signal output unit and the rotational movement detection signal output unit are communicatively connected to the processing unit via a communication network. Track displacement can thus be monitored in the management base.

A track displacement measurement method according to a tenth aspect includes: (a) determining first displacement of a track by performing processing including an integration operation based on motion detection signal responsive to motion of a railroad car due to displacement of the track; (b) determining second displacement of the railroad car based on rotational movement detection signal responsive to rotational movement of the railroad car; and (c) determining combined displacement of the track based on the first displacement and the second displacement.

According to the method, the first displacement can be determined by performing processing including the integration operation based on the motion detection signal responsive to motion of the railroad car due to displacement of the track. Displacement suitably determined by performing processing different from the processing including the integration processing can be determined as the second displacement of the track based on the rotational movement detection signal responsive to rotational movement of the railroad car. The combined displacement can be determined based on the first displacement and the second displacement. The track displacement reflecting curves of the track can thus be measured.

An eleventh aspect is the track displacement measurement method according to the tenth aspect, wherein in step (a), the first displacement is determined by determining a location of the track relative to the railroad car, and performing the processing including the integration operation based on the motion detection signal responsive to motion of the railroad car due to displacement of the track on the determined location of the track. The first displacement of the track can thus be determined so that as much as possible of the influence of motion of the railroad car due to displacement of the track is eliminated.

A twelfth aspect is the track displacement measurement method according to the tenth or the eleventh aspect, further comprising (d) attenuating a low frequency component of the motion detection signal before the step (a). Divergence of an operation result is suppressed when the integration operation is performed based on the motion detection signal.

A thirteenth aspect is the track displacement measurement method according to the twelfth aspect, further comprising (e) attenuating a high frequency component of the rotational movement detection signal before the step (b). The first displacement reflects displacement responsive to the high frequency component not attenuated mainly by the low frequency component attenuation unit. The second displacement reflects displacement responsive to the low frequency component not attenuated mainly by the high frequency component attenuation unit. By combining the first displacement and the second displacement to determine the combined displacement, track displacement more accurately reflecting curves of the track can be measured.

A fourteenth aspect is the track displacement measurement method according to any one of the tenth to the thirteenth aspects, wherein in the step (b), the second displacement is determined based on a speed of the railroad car and angular velocity of the railroad car. The second displacement can thus be determined based on the speed of the railroad car and the angular velocity.

A fifteenth aspect is the track displacement measurement method according, to any one of the tenth to the fourteenth aspects, further comprising (f) comparing the combined displacement with a reference value, and providing notification of a result of comparison. The result of comparison of the combined displacement with the reference value can thus easily be known.

Track displacement reflecting curves of a track can be measured in any of the above-mentioned aspects.

Many modifications and other embodiments of the present disclosure will be apparent to those skilled in the art from the foregoing description. Accordingly, the foregoing description is to be construed as illustrative only, and is provided for the purpose of teaching those skilled in the art the best mode for carrying out the disclosure. The details of the structure and/or function may be varied substantially without departing from the scope of the disclosure.

EXPLANATION OF REFERENCE SIGNS 12 management base
16 track
17 rail
20 railroad car
30 track displacement measurement system
41 speed sensor
42 gyroscope sensor
42a yaw rate sensor
42b roll rate sensor
42c pitch rate sensor
42d lateral acceleration sensor
42e vertical acceleration sensor
50 track relative location measurement unit
58a measurement data
60 track displacement measurement device
62 arithmetic processing unit
63 storage
63a measurement data
63b combined displacement data
63c reference data
63d determination result data
64 displacement calculation program
64a first displacement calculation unit
64b second displacement calculation unit
64c combined displacement calculation unit
64d high-pass filter
64e low-pass filter
69 display
80 route map
82 arrow

The invention claimed is:

1. A track displacement measurement system comprising:
a track displacement measurement device that measures displacement of a track on which a railroad car runs, the track displacement measurement device including:
input circuitry that receives, from a motion detection sensor, a motion detection signal responsive to motion of the railroad car due to displacement of the track and a rotational movement detection signal, from a rotational movement detection sensor, responsive to rotational movement of the railroad car;
circuitry that determines first displacement of the track by performing processing including an integration operation based on the motion detection signal, determines second displacement of the track based on the rotational movement detection signal, and determines combined displacement of the track based on the first displacement and the second displacement;
the motion detection sensor that is provided to the railroad car, and outputs the motion detection signal responsive to motion of the railroad car due to the displacement of the track; and
the rotational movement detection sensor that is provided to the railroad car, and outputs the rotational movement detection signal responsive to the rotational movement of the railroad car.

2. The track displacement measurement system according to claim 1, wherein
the input circuitry receives a track relative location signal responsive to a location of the track relative to the railroad car, and
the circuitry determines the first displacement by performing the processing including the integration operation based on the motion detection signal on the location of the track relative to the railroad car.

3. The track displacement measurement system according to claim 2, further comprising
a high pass filter that attenuates a low frequency component of the motion detection signal.

4. The track displacement measurement system according to claim 2, wherein
an angular velocity signal responsive to angular velocity of the railroad car is input as the rotational movement detection signal, and
the circuitry determines the second displacement based on a speed of the railroad car and the angular velocity of the railroad car based on the angular velocity signal.

5. The track displacement measurement system according to claim 2, further comprising
a storage medium that stores combined displacement data associating the combined displacement of the track determined by the circuitry with a location of the track.

6. The track displacement measurement system according to claim 1, further comprising
a high pass filter that attenuates a low frequency component of the motion detection signal.

7. The track displacement measurement system according to claim 6, further comprising
a low pass filter that attenuates a high frequency component of the rotational movement detection signal.

8. The track displacement measurement system according to claim 6, wherein
an angular velocity signal responsive to angular velocity of the railroad car is input as the rotational movement detection signal, and the circuitry determines the second displacement based on a speed of the railroad car and the angular velocity of the railroad car based on the angular velocity signal.

9. The track displacement measurement system according to claim 3, further comprising
a storage medium that stores combined displacement data associating the combined displacement of the track determined by the circuitry with a location of the track.

10. The track displacement measurement system according to claim 1, wherein
an angular velocity signal responsive to angular velocity of the railroad car is input as the rotational movement detection signal, and
the circuitry determines the second displacement based on a speed of the railroad car and the angular velocity of the railroad car based on the angular velocity signal.

11. The track displacement measurement system according to claim 1, further comprising
a storage medium that stores combined displacement data associating the combined displacement of the track determined by the circuitry with a location of the track.

12. The track displacement measurement system according to claim 1, wherein the circuitry compares the combined displacement with a reference value, and provides notification of a result of comparison.

13. The track displacement measurement system according to claim 1, wherein
the circuitry is provided to a management base, and
the motion detection sensor and the rotational movement detection sensor are communicatively connected to the circuitry via a communication network.

14. A track displacement measurement method comprising:
determining first displacement of a track by performing processing including an integration operation based on a motion detection signal, from a motion detection sensor, responsive to motion of a railroad car due to displacement of the track, wherein the motion detection sensor is provided to the railroad car, and outputs the motion detection signal responsive to motion of the railroad car due to the displacement of the track;
determining second displacement of the railroad car based on a rotational movement detection signal, from a rotational movement detection sensor, responsive to rotational movement of the track, wherein the rotational movement detection sensor is provided to the railroad car, and outputs the rotational movement detection signal responsive to the rotational movement of the railroad car; and
determining combined displacement of the track based on the first displacement and the second displacement.

15. The track displacement measurement method according to claim 14, wherein
in the determining of the first displacement of the track, the first displacement is determined by determining a location of the track relative to the railroad car, and performing the processing including the integration operation based on the motion detection signal responsive to motion of the railroad car due to displacement of the track on the determined location of the track.

16. The track displacement measurement method according to claim 14, further comprising
attenuating a low frequency component of the motion detection signal before the determining of the first displacement of the track.

17. The track displacement measurement method according to claim 16, further comprising
attenuating a high frequency component of the rotational movement detection signal before the determining of the second displacement of the railroad car.

18. The track displacement measurement method according to claim 14, wherein
in the determining of the second displacement of the railroad car, the second displacement is determined based on a speed of the railroad car and angular velocity of the railroad car.

19. The track displacement measurement method according to claim 14, further comprising
comparing the combined displacement with a reference value, and providing notification of a result of comparison.

* * * * *